US011040746B2

(12) United States Patent
Waita et al.

(10) Patent No.: US 11,040,746 B2
(45) Date of Patent: Jun. 22, 2021

(54) MOVING BODY

(71) Applicant: HONDA MOTOR CO., LTD., Tokyo (JP)

(72) Inventors: Hironori Waita, Saitama (JP); Tetsuaki Kurebayashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 77 days.

(21) Appl. No.: 16/358,180

(22) Filed: Mar. 19, 2019

(65) Prior Publication Data

US 2019/0291795 A1  Sep. 26, 2019

(30) Foreign Application Priority Data

Mar. 22, 2018 (JP) .............................. JP2018-053942

(51) Int. Cl.
| | | |
|---|---|---|
| *B62D 61/00* | (2006.01) | |
| *B60G 3/00* | (2006.01) | |
| *B60B 19/14* | (2006.01) | |
| *B60B 19/00* | (2006.01) | |

(Continued)

(52) U.S. Cl.
CPC ............ *B62D 61/00* (2013.01); *B60B 19/003* (2013.01); *B60B 19/14* (2013.01); *B60G 3/00* (2013.01); *B60K 7/0007* (2013.01); *B60B 33/08* (2013.01)

(58) Field of Classification Search
CPC .......... B25J 5/00; B60B 33/08; B60B 19/003; B60B 19/14; B62D 61/00; B62D 5/02; B62D 63/02; B62D 63/04; B60G 3/00; B60K 7/0007; B60K 17/30; B60K 2007/003; B60Y 2200/60; B60Y 2200/40
See application file for complete search history.

(56) References Cited

U.S. PATENT DOCUMENTS

| | | | | |
|---|---|---|---|---|
| 631,804 | A | * 8/1899 | Manley | ................... B60B 33/08 |
| | | | | 16/26 |
| 1,271,113 | A | * 7/1918 | Armband | ................ B60B 33/08 |
| | | | | 16/26 |

(Continued)

FOREIGN PATENT DOCUMENTS

| | | | | |
|---|---|---|---|---|
| FR | 2695447 | A1 * | 3/1994 | ............... B60B 9/22 |
| JP | 3498043 | B2 * | 2/2004 | |

(Continued)

OTHER PUBLICATIONS

Japanese Office Action dated Sep. 17, 2019, 4 pages.

*Primary Examiner* — Karen Beck

(74) *Attorney, Agent, or Firm* — Rankin, Hill & Clark LLP

(57) ABSTRACT

Provided is a moving body capable of transmitting driving force of a drive unit to a spherical wheel without a separation between the spherical wheel and the drive unit even in the case where the moving body receives impact due to the road surface condition or the like. The moving body (10) is a self-sustained mobile robot. The moving body (10) includes a spherical wheel (21), a drive unit (22) which is in contact with the spherical wheel (21) to give a rotational driving force to the spherical wheel (21), a support (31) which supports the drive unit (22), and a biasing mechanism (41) which is suspended from the support (31) and abuts on the spherical wheel (21) to bias the spherical wheel (21) in a direction toward the support (31).

3 Claims, 7 Drawing Sheets

(51) Int. Cl.
   *B60B 33/08* (2006.01)
   *B60K 7/00* (2006.01)

(56) References Cited

U.S. PATENT DOCUMENTS

| | | | | |
|---|---|---|---|---|
| 1,356,566 | A * | 10/1920 | Smith | B60B 33/08 |
| | | | | 16/26 |
| 9,796,213 | B1 * | 10/2017 | Menard | B60B 33/0063 |
| 2008/0283311 | A1 * | 11/2008 | Li | B62D 37/00 |
| | | | | 180/65.1 |
| 2010/0038960 | A1 * | 2/2010 | Takenaka | B62K 1/00 |
| | | | | 305/133 |
| 2010/0243342 | A1 * | 9/2010 | Wu | B60B 19/14 |
| | | | | 180/7.1 |
| 2011/0260523 | A1 * | 10/2011 | Takenaka | B60B 19/125 |
| | | | | 301/5.23 |
| 2017/0253082 | A1 * | 9/2017 | Hsieh | B60B 33/0063 |
| 2019/0145471 | A1 * | 5/2019 | Carbone | F16D 49/10 |
| | | | | 180/210 |
| 2019/0248177 | A1 * | 8/2019 | Almutairi | A63C 17/015 |

FOREIGN PATENT DOCUMENTS

| | | | |
|---|---|---|---|
| JP | 2005-342818 | | 12/2005 |
| JP | 2009-234524 | A | 10/2009 |

\* cited by examiner

MOVING BODY

BACKGROUND OF THE INVENTION

1. Field of the Invention

The present invention relates to a moving body moved by rotating a spherical wheel by using a drive unit.

2. Description of the Related Art

In recent years, development has been made in a moving body such as a mobile robot that moves in a self-sustained manner to perform various works. For example, Paten Document 1 describes a moving body that includes a cylindrical body and one spherical wheel at the bottom thereof and travels by rotating the spherical wheel. The moving body is configured to have a trunk placed on one spherical wheel and to stand still or to move by giving a driving force of a plurality of omni wheels placed at the bottom of the trunk and at the top of the spherical wheel to the spherical wheel.

CITATION LIST

Patent Document

Patent Document 1: Japanese Patent Application Laid-Open No. 2005-342818.

In the moving device provided at the bottom of the moving body of Patent Document 1, a contact of a driving member of each omni wheel to the spherical wheel transmits the driving force to the spherical wheel. In addition, there is arranged a coming-off prevention spacer for preventing the spherical wheel from coming off the body on the lower side of the vertical center of the spherical wheel.

When the moving body receives an impact due to road surface roughness or the like while moving, however, the spherical wheel temporarily gets away from the drive member, and the separation between the spherical wheel and the drive member inhibits the transmission of an appropriate driving force to the spherical wheel, thereby making it difficult to correctly control the movement of the moving body.

In view of the above problem, the present invention has been made, and an object of the present invention is to provide a moving body capable of transmitting a driving force of a drive unit to a spherical wheel without a separation between the spherical wheel and the drive unit, even in the case where the moving body receives an impact due to the road surface condition or the like.

SUMMARY OF THE INVENTION

[1] In order to accomplish the above object, the present invention includes: a spherical wheel; a drive unit which is in contact with the spherical wheel and gives a rotational driving force to the spherical wheel; a support which supports the drive unit; and a biasing mechanism which is suspended from the support and abuts on the spherical wheel to bias the spherical wheel in a direction toward the support.

According to the present invention, the biasing mechanism biases the spherical wheel in a direction toward the support. Therefore, the drive unit is able to be pressed against the spherical wheel by a force equal to or greater than the weight of a machine body including the drive unit and the support, and even in the case where the moving body receives an impact due to the road surface condition or the like, the driving force of the drive unit can be transmitted to the spherical wheel without the separation between the spherical wheel and the drive unit.

[2] Furthermore, in the present invention, preferably the biasing mechanism includes an annular enclosing member which encloses a part or all of a circumference of the spherical wheel, a plurality of abutting portions which are arranged in the enclosing member in a rotationally symmetrical manner with respect to a central axis of the enclosing member and which abut on the spherical wheel, and a biasing member biasing the enclosing member toward the support, and preferably the biasing mechanism is suspended by a connecting member which connects the enclosing member to the support.

According to the above configuration, there are provided the plurality of abutting portions, which are arranged in the enclosing member in the rotationally, symmetrical manner with respect to the central axis of the enclosing member, and abut on the spherical wheel. Therefore, horizontal direction components of reaction force generated by biasing the spherical wheel can cancel each other out, and there is no need to increase the strength of the spherical wheel or the drive unit to resist the reaction force, thus enabling reduction in weight of the moving body.

[3] Furthermore, in the present invention, preferably the connecting member includes a link member swingably connected to the support and a frame member swingably connected to the link member, and preferably the biasing mechanism is provided at the frame member and is suspended from the support through the frame member.

According to the above configuration, the link member is swingably connected to the support and to the frame member, by which the biasing mechanism provided at the frame member is suspended movably relative to the support, thereby the abutting portion of the biasing mechanism provided at the frame member is able to follow a minute change in position of the spherical wheel. Therefore, the moving body has a so-called aligning function and is able to bias the spherical wheel with uniform forces in respective positions even in the case of a change in the position of the spherical wheel. Furthermore, even in the case where the spherical wheel moves, the biasing member follows the movement and biases the spherical wheel, thereby preventing the spherical wheel from getting away from the drive unit.

[4] Furthermore, in the present invention, preferably the biasing mechanism is suspended from the support through a linear motion guide.

According to the above configuration, when the biasing member moves in a direction of advancing or retreating to or from the support, the biasing member moves in a parallel manner without inch nation by means of the linear motion guide, thereby preventing the biasing mechanism from abutting on the spherical wheel in an inclined state.

[5] Furthermore, in the present invention, preferably the biasing mechanism is suspended from the frame member through the linear motion guide.

According to the above configuration, when the biasing member moves in a direction of advancing or retreating to or from the support, the biasing member moves in a parallel manner without inclination by means of the linear motion guide, thereby preventing the biasing mechanism from abutting on the spherical wheel in an inclined state.

DESCRIPTION OF THE PREFERRED EMBODIMENTS

First Embodiment

Figure 1:
FIG. 1 is a perspective view illustrating a moving body according to a first embodiment of the present invention.
Figure 2:
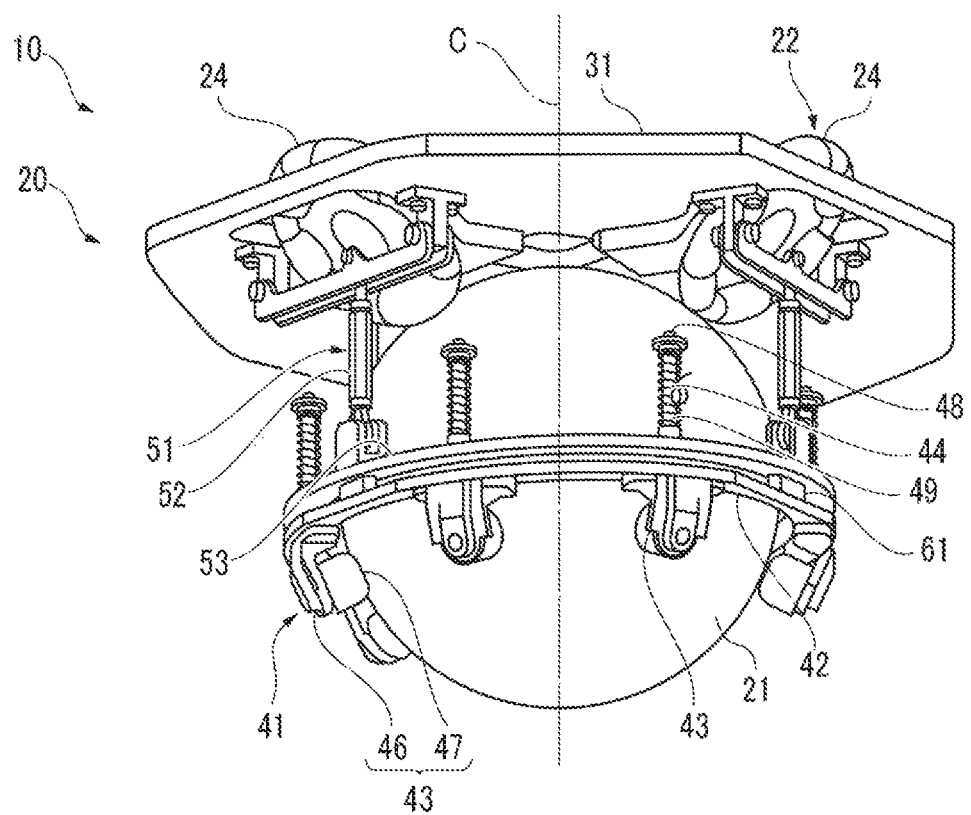
FIG. 2 is a perspective view illustrating a main part of the moving body of the first embodiment of the present invention.
Figure 3:
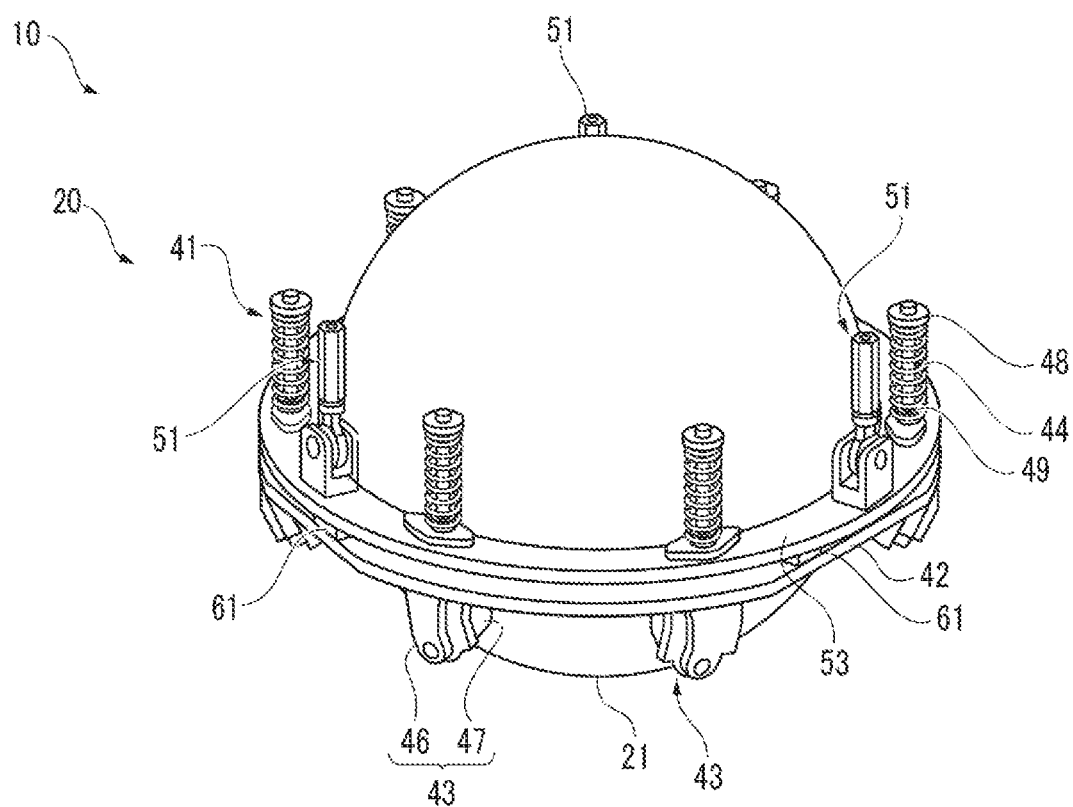
FIG. 3 is a perspective view from another angle illustrating the main part of the moving body illustrated in FIG. 2.
Figure 4:
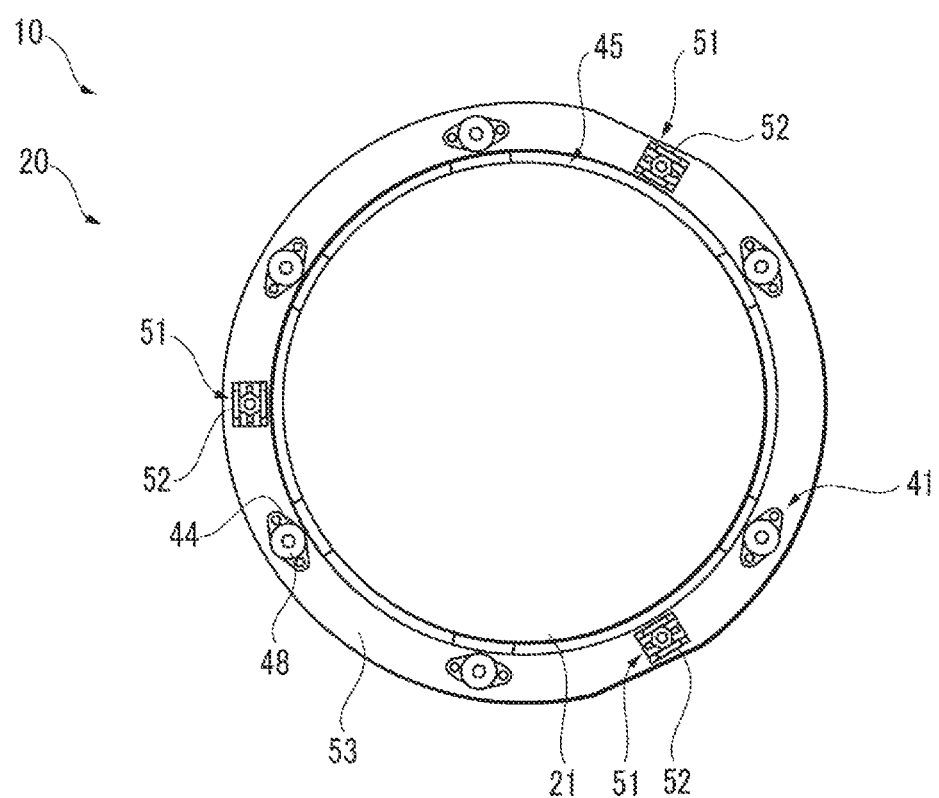
FIG. 4 is a top view of a frame member and a spherical wheel illustrated in FIG. 2.

A moving body 10 of an embodiment of the present invention will be described with reference to appended drawings. As illustrated in FIGS. 1 and 2, the moving body 10 of the embodiment of the present invention includes a trunk portion 11 and a traveling mechanism 20 arranged at the bottom of the trunk portion 11. The traveling mechanism 20 is configured to be movable in all directions, to front, rear, left, and right, by rotating a single spherical wheel 21.

The moving body 10 is provided with a camera 12 as an environmental sensor in the outer periphery of the upper end portion of the trunk portion 11. The camera 12 protrudes from the trunk portion 11. The camera 12 is enclosed by a protective member.

As illustrated in FIGS. 2 to 5, the traveling mechanism 20 arranged at the lower part of the moving body 10 includes a spherical wheel 21, a drive unit 22 which is in contact with the spherical wheel 21 to give a rotational driving force to the spherical wheel 21, a support 31 which supports the drive unit 22, and a biasing mechanism 41 which is suspended from the support 31 and abuts on the spherical wheel 21 to bias the spherical wheel 21 toward the support 31.

The biasing mechanism 41 includes an annular enclosing member 42, which encloses the entire circumference of the spherical wheel 21, a plurality of abutting portions 43, which are arranged in a rotationally symmetrical manner with respect to the central axis C of the enclosing member 42 and abut on the spherical wheel 21, and a biasing member 44 biasing the enclosing member 42 toward the support 31. The biasing mechanism 41 is suspended by a connecting member 51 connecting the enclosing member 42 to the support 31.

The enclosing member 42 has an annular shape enclosing the entire circumference of the spherical wheel 21 with a gap 45 formed between the spherical wheel 21 and the enclosing member 42. In other words, the spherical wheel 21 protrudes from the inner periphery of the enclosing member 42 having an annular shape. Additionally, with respect to the inner periphery of the enclosing member 42, a plane including the enclosing member 42 has a circular shape enclosing a part or all of the circumference of a circle intersecting the spherical wheel 21 (intersection circle). Furthermore, a gap 45 is provided between the inner periphery of the enclosing member 42 and the spherical wheel 21.

The abutting portion 43 is a so-called ball caster including a case 46 and a ball 47 rotatably supported by the case 46 and is arranged in six places at regular intervals on the enclosing member 42.

The connecting member 51 includes a link member 52 swingably connected to the support 31 and an annular frame member 53 swingably connected to the link member 52.

The frame member 53 has an annular shape enclosing the entire circumference of the spherical wheel 21 with a gap 45 formed between the spherical wheel 21 and the frame member 53. Furthermore, although it has been described that the frame member 53 has an annular shape enclosing the entire circumference of the spherical wheel 21, the frame member 53 is not limited thereto. The frame member 53 may be a C-shaped member, which has a partially-broken shape, or may be composed of a plurality of parts connected to each other so as to form an annular shape. Incidentally, the frame member 53 preferably has a shape fitted to the shape of the enclosing member 42 and is formed in a position opposed to the enclosing member 42.

Furthermore, the biasing mechanism 41 is provided in the frame member 53 and suspended from the support 31 through the frame member 53. Furthermore, the biasing mechanism 41 is suspended from the frame member 53 through the linear motion guide 61.

The frame member 53 is provided with a through-hole (not illustrated) into which the insertion rod 49 penetrates, and the biasing member (compression spring) 44 is inserted into the insertion rod 49. The through-hole is formed in the frame member in a plurality of positions rotation-symmetric with respect to the central axis C of the frame member 53.

The biasing member 44 of the biasing mechanism 41 is a compression spring and is formed larger in diameter than the through-hole formed in the frame member 53, having the lower end portion arranged on the frame member 53 so as to enclose the through-hole. An end plate 48 larger in diameter than the biasing member 44 is provided in the upper end portion of the biasing member 44. The end plate 48 is connected to one end portion of the insertion rod 49, which is inserted into the inside of the biasing member 44 (compression spring) and into the through-hole of the frame member 53. The insertion rod 49 has the other end portion passing through the through-hole and connected to the enclosing member 42. The biasing member 44, the end plate 48, the insertion rod 49, and the like are each arranged in six places near the abutting portion 43.

The link member 52 is arranged in three places at regular intervals in the frame member 53. The upper end portion of the link member 52 is connected to the support 31 with a first ball joint 54 and the lower end portion of the link member 52 is connected to the frame member 53 with a second ball joint 55. The connection between the support 31 and the frame member 53 with the link member 52 forms a so-called link mechanism, by which the frame member 53 is kept in parallel with the support 31.

Furthermore, the enclosing member 42 of the biasing mechanism 41 is suspended from the frame member 53 through the linear motion guide 61, by which the enclosing member 42 is able to be moved away from or close to the frame member 53 with the enclosing member 42 kept in parallel with the frame member 53. This prevents the enclosing member 42 from inclining to the support 31.

Figure 5:
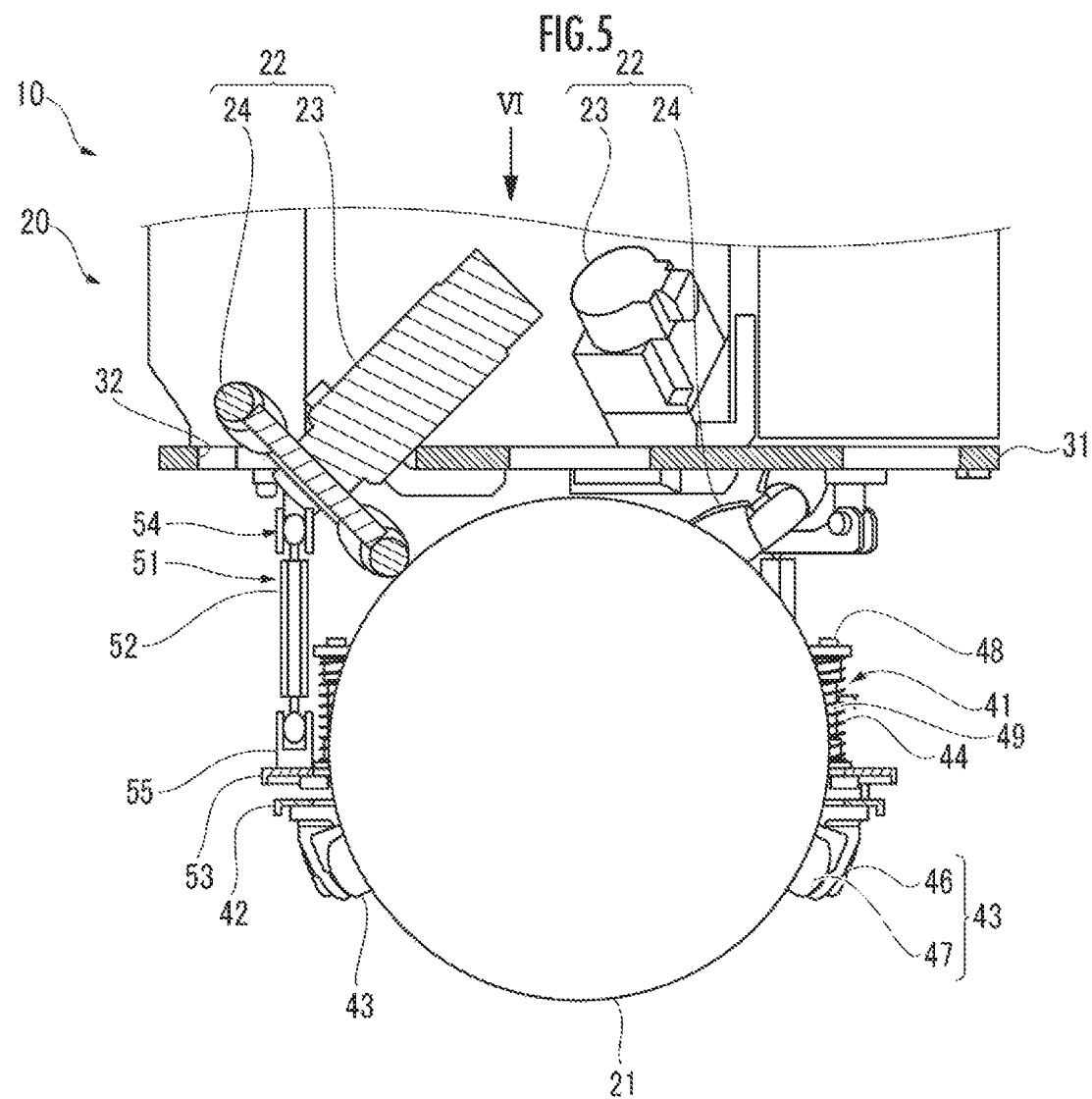
FIG. 5 is a sectional view illustrating the main part of the moving body illustrated in FIG. 2.
Figure 6:
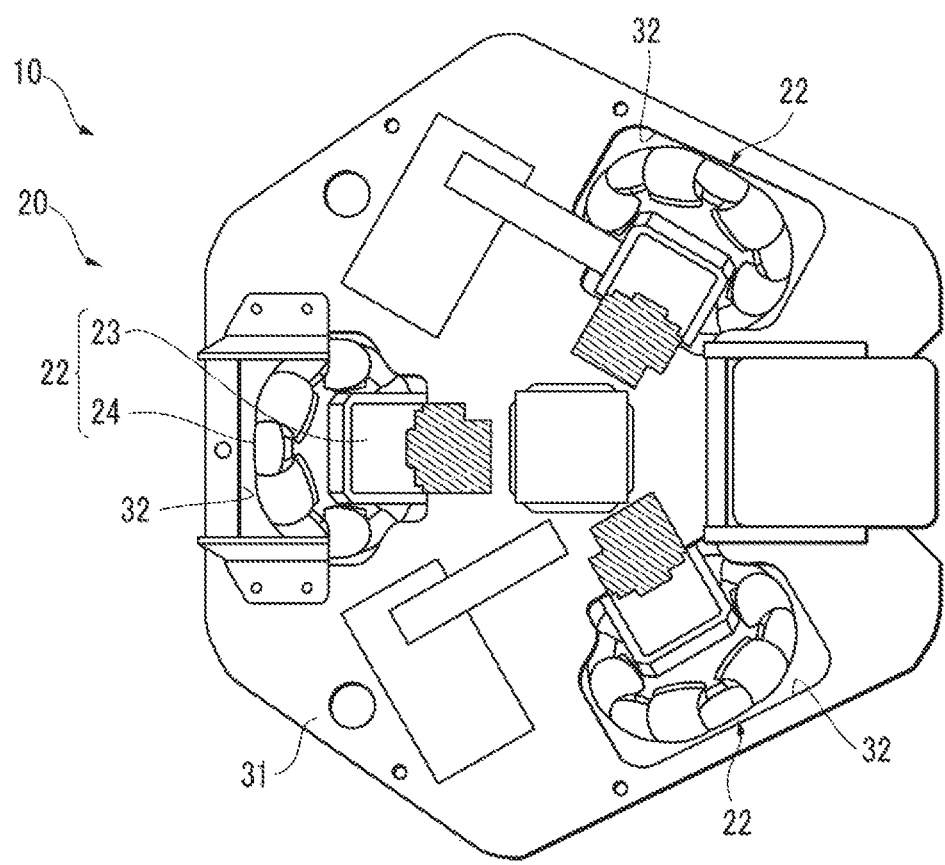
FIG. 6 is a top view of a support illustrated in FIG. 2.

As illustrated in FIGS. 5 and 6, the support 31 is a plate-like member and an opening 32 for arranging the drive unit 22 is formed in three places in the support 31 so as to be rotation-symmetric with respect to the central axis C of the support 31.

The drive unit 22 includes a motor unit 23 serving as a driving source and an omni wheel 24 provided on the rotating shaft of the motor unit 23. The motor unit 23 is fixed to the support 31 so that the rotating shaft of the motor unit 23 inclines to the support 31 and that the omni wheel 24 and a part of the motor unit 23 are located inside the opening 32.

The drive unit 22 is provided in three places in the support 31 and each of the omni wheels 24 of three drive units 22 abuts on the spherical wheel 21. The driving force from the drive unit 22 is transmitted to the spherical wheel 21 through the omni wheel 24 to rotate the spherical wheel 21.

The following describes the actions of the moving body 10 described hereinabove. The action diagrams described below conceptually illustrate the configuration of the moving body 10.

Figure 7A:
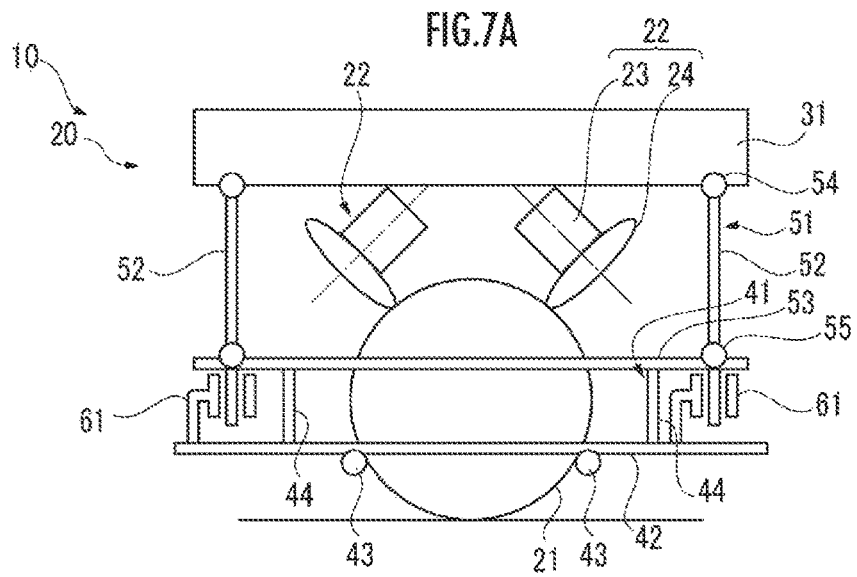
FIG. 7A is an action diagram of the first embodiment of the present invention.

As illustrated in FIG. 7A, in the moving body 10, one end portion of the link member 52 constituting the connecting member 51 is swingably connected to the support 31 and the other end portion of the link member 52 is connected to the frame member 53. In the moving body 10, one end portion of the biasing member 44 constituting the biasing mechanism 41 and one end portion of the linear motion guide 61 are connected to the frame member 53, and the other end portion of the biasing member 44 and the other end portion of the linear motion guide 61 are connected to the enclosing member 42. The abutting portion 43 provided in the enclosing member 42 abuts on the spherical wheel 21. The omni wheel 24 of the drive unit 22 provided in the support 31 abuts on the spherical wheel 21.

Therefore, first, the biasing mechanism 41 biases the spherical wheel 21 toward the support 31. As a result, even in the case where the moving body 10 vibrates due to the road surface condition, the spherical wheel 21 is able to abut on the drive unit 22, thereby enabling accurate traveling of the moving body 10.

Second, the linear motion guide 61 causes the enclosing member 42 to move in parallel with the frame member 53. This prevents the inclination of the enclosing member 42.

Third, the link mechanism including the support 31, the link member 52, and the frame member 53 fulfills an aligning function of locating the center of the spherical wheel 21 in the position of the central axis of the plurality of drive units 22 and then moving the central axis of the plurality of abutting portions 43 of the biasing mechanism 41 to the central axis of the plurality of drive units 22. As a result, even in the case of an occurrence of a difference between the center of the plurality of drive units 22 and the center of the spherical wheel 21, which is caused by an error in manufacturing, or a difference between the center of the plurality of drive units 22 and the center of the spherical wheel 21, which is caused by vibration when moving or by an impact or the like received when moving, the aligning action of the link mechanism causes the center of the plurality of drive units 22 to match the center of the spherical wheel 21, thereby enabling the driving forces of the drive units 22 to be transmitted to the spherical wheel 21.

Second Embodiment

Figure 7B:
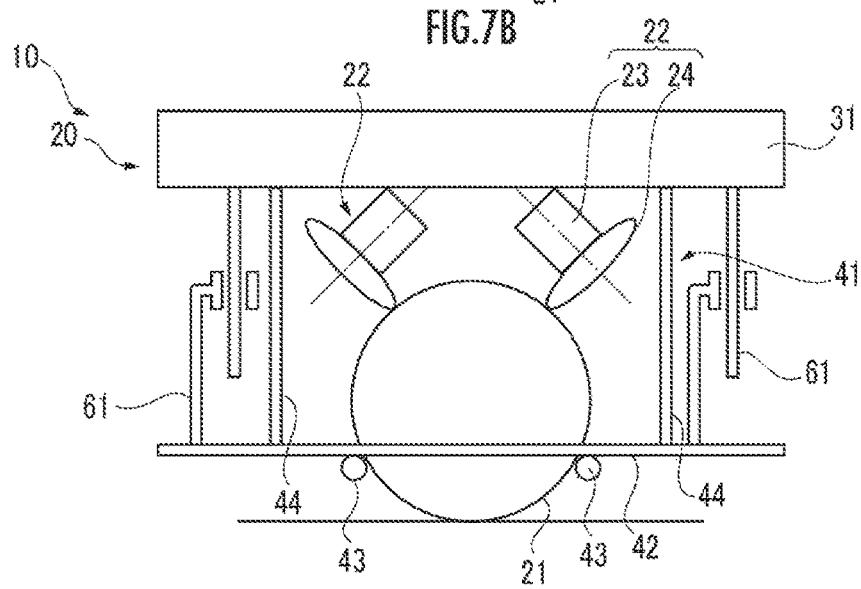
FIG. 7B is an action diagram of a second embodiment of the present invention.

Subsequently, a second embodiment will be described. The explanation of the same configuration and the like as those of the first embodiment will be omitted hereinafter. As illustrated in FIG. 7B, in the moving body 10, one end portion of the biasing member 44 constituting the biasing mechanism 41 and one end portion of the linear motion guide 61 are connected to the support 31, and the other end portion of the biasing member 44 and the other end portion of the linear motion guide 61 are connected to the enclosing member 42. The abutting portion 43 provided in the enclosing member 42 abuts on the spherical wheel 21. Moreover, the omni wheel 24 of the drive unit 22 provided in the support 31 abuts on the spherical wheel 21.

First, the biasing mechanism 41 biases the spherical wheel 21 toward the support 31. As a result, even in the case where the moving body 10 vibrates due to the road surface condition, the spherical wheel 21 is able to abut on the drive unit 22, thereby enabling accurate traveling of the moving body 10.

Second, the linear motion guide 61 causes the enclosing member 42 to move in parallel with the support 31. This prevents the inclination of the enclosing member 42.

Third Embodiment

Figure 7C:
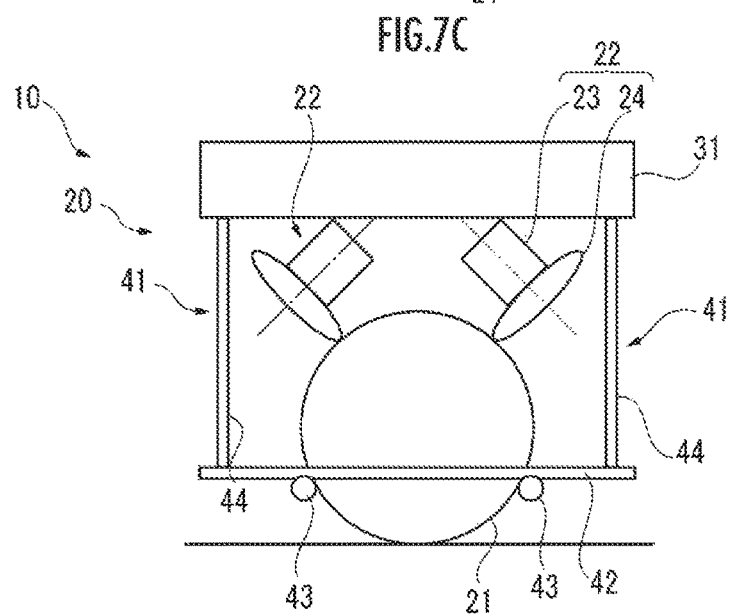
FIG. 7C is an action diagram of a third embodiment of the present invention.

Subsequently, a third embodiment will be described. The explanation of the same configuration and the like as those of the first embodiment will be omitted hereinafter. As illustrated in FIG. 7C, in the moving body 10, one end portion of the biasing member 44 constituting the biasing mechanism 41 is connected to the support 31, and the other end portion of the biasing member 44 is connected to the enclosing member 42. The abutting portion 43 provided in the enclosing member 42 abuts on the spherical wheel 21. Moreover, the omni wheel 24 of the drive unit 22 provided in the support 31 abuts on the spherical wheel 21.

According to this configuration, the biasing mechanism 41 biases the spherical wheel 21 toward the support 31. As a result, even in the case where the moving body 10 vibrates due to the road surface condition, the spherical wheel 21 is able to abut on the drive unit 22 and the rotation of the drive unit 22 is able to be transmitted to the spherical wheel 21, thereby enabling the moving body 10 to move an accurate distance.

The following describes advantageous effects of the moving body 10 described hereinabove.

The biasing mechanism 41 biases the spherical wheel 21 toward the support. Therefore, the drive unit 22 is able to be pressed against the spherical wheel 21 with a force equal to or greater than the weight of a machine body including the drive unit 22 and the support 31, by which, even in the case where the moving body 10 receives an impact due to the road surface condition or the like, the driving force of the drive unit 22 is able to be transmitted to the spherical wheel 21 without the separation between the spherical wheel 21 and the drive unit 22.

Moreover, the enclosing member 42 includes the plurality of abutting portions 43, which are arranged in a rotationally symmetrical manner with respect to the central axis C of the enclosing member 42 and abut on the spherical wheel 21, and therefore horizontal direction components of reaction force generated by biasing the spherical wheel 21 can cancel each other out, by which there is no need to increase the strength of the spherical wheel 21 or the drive unit 22 to resist the reaction force, thus enabling a reduction in weight of the moving body 10.

Furthermore, the link member 52 is swingably connected to the support 31 and to the frame member 53, by which the biasing mechanism 41 provided in the frame member 53 is suspended movably relative to the support 31. Therefore, the abutting portion 43 of the biasing mechanism 41 provided in the frame member 53 is able to follow a minute change in position of the spherical wheel 21. Therefore, the moving body 10 has a so-called aligning function and is able to bias the spherical wheel 21 with uniform forces in respective positions even in the case of a change of the position of the spherical wheel 21. Furthermore, even in the case where the spherical wheel 21 moves, the biasing mechanism 41 follows the movement and biases the spherical wheel 21, thereby preventing the spherical wheel 21 from getting away from the drive unit 22.

Furthermore, the biasing mechanism 41 is suspended from the support 31 through the linear motion guide 61. Therefore, when the biasing mechanism 41 moves in a direction of advancing or retreating to or from the support 31, the biasing mechanism 41 moves in a parallel fashion without inclination by means of the linear motion guide 61, thereby preventing the biasing mechanism 41 from abutting on the spherical wheel 21 in an inclined state.

Furthermore, the biasing mechanism 41 is suspended from the frame member 53 through the linear motion guide 61. Therefore, when the biasing member 44 moves in a direction of advancing or retreating to or from the support, the biasing member 44 moves in a parallel fashion without inclination by means of the linear motion guide 61, thereby preventing the biasing mechanism 41 from abutting on the spherical wheel 21 in an inclined state.

Although the abutting portion 43 has been arranged in six places in the enclosing member 42 in this embodiment, the present invention is not limited thereto, but the abutting portion 43 may be arranged in three, four, five, or seven or more places or the like, and any number of places where the abutting portion is arranged may be applied as long as the movement of the spherical wheel 21 can be regulated so that the spherical wheel 21 remains on the central axis C side of the enclosing member 42. Moreover, it has been described that the abutting portion 43 is a ball caster including the case 46 and the ball 47, but the present invention is not limited thereto and the abutting portion 43 may be a slip pad that abuts and slips on the rotating spherical wheel 21.

The configuration of the biasing mechanism 41 is not limited to the above, and the biasing member 44, the end plate 48, the insertion rod 49, or the like may be arranged in three, four, or seven or more places. Furthermore, the biasing member 44 may be provided as a tension spring, instead of the compression spring, on the opposite side to the side of the above embodiment of the frame member 53 and to be directly connected to the enclosing member 42 to pull the enclosing member. Moreover, in the biasing mechanism 41, the biasing member 44 may be a leaf spring or rubber and further may be formed of a single cylindrical rubber member enclosing the spherical wheel 21. The biasing mechanism 41 may have any configuration as long as it is able to bias the spherical wheel 21 toward the support 31.

Although ball joints 54 and 55 have been used for connecting the link member 52 to the support 31 and to the frame member 53 in this embodiment, the present invention is not limited thereto, as long as the link member 52 is swingably connected to the support 31 and to the frame member 53. For example, the support 31 and the frame member 53 may be provided with a shaft so that the link member 52 is swingably connected to the shaft, or the like, as long as the link member 52 is swingable. Although the link member 52 has been arranged in three places in the frame member 53, the present invention is not limited thereto, but the link member 52 may be arranged in four, five, or six or more places, as long as the configuration including the support 31, the link member 52, and the frame member 53 has an aligning function so that the central axis of the frame member 53 coincides with the center of the spherical wheel 21.

Although there have been provided three openings 32 formed in the support 31 and three drive units 22 in this embodiment, the present invention is not limited thereto, and one, two, or four or more openings 32 and drive units 22 may be provided. Any number of openings 32 and any number of drive units 22 may be applied, as long as the driving force of the drive units 22 can be transmitted to the spherical wheel 21.

Moreover, although the drive units 22 have been provided so that the rotating shaft of the motor unit 23 inclines to the support 31, any inclination angle may be applied as long as the driving force of the drive units 22 can be transmitted to the spherical wheel 21.

Furthermore, although it has been described that the support 31 is a plate-like member in this embodiment, the support 31 may be a block-like member or a member composed of a plurality of rod-like members. The support 31 may have any shape, as long as the drive units 22 and the connecting member 51 can be connected thereto.

Moreover, although the moving body 10 includes one spherical wheel 21 in this embodiment, the present invention is not limited thereto. The moving body 10 may have two, three, or more spherical wheels 21.

Although the moving body 10 is in a rising state, the spherical wheel 21 is provided at the bottom of the moving body 10, and the spherical wheel 21 is in contact with the road surface (floor) in this embodiment, the present invention is not limited thereto. The spherical wheel 21 may be provided in the horizontal side portion or in the obliquely-lateral side portion of the moving body 10, so that the spherical wheel 21 comes in contact with the wall. Furthermore, the spherical wheel 21 may be provided at the top of the moving body 10 so as to be exposed upward, so that the spherical wheel 21 comes in contact with the ceiling.

DESCRIPTION OF THE REFERENCE NUMERALS

10 Moving body
21 Spherical wheel
22 Drive unit
31 Support
41 Biasing mechanism
42 Enclosing member
43 Abutting portion (Ball caster)
44 Biasing member
51 Connecting member
52 Link member
53 Frame member
61 Linear motion guide

What is claimed is:

1. A moving body comprising:
   a spherical wheel;
   a drive unit which is in contact with the spherical wheel and gives rotational driving force to the spherical wheel;
   a support which supports the drive unit; and
   a biasing mechanism which is suspended from the support and abuts on the spherical wheel to bias the spherical wheel in a direction toward the support,
   wherein:
   the biasing mechanism comprises an annular enclosing member which encloses a part or all of a circumference of the spherical wheel, a plurality of abutting portions which are arranged in the enclosing member in a rotationally symmetrical manner with respect to a central axis of the enclosing member and which abut on the spherical wheel, and a biasing member biasing the enclosing member toward the support;

the biasing mechanism is suspended by a connecting member which connects the enclosing member to the support;

the connecting member comprises a link member swingably connected to the support and a frame member swingably connected to the link member; and the biasing mechanism is provided at the frame member and is suspended from the support through the frame member.

2. The moving body according to claim 1, wherein the biasing mechanism is suspended from the frame member through a linear motion guide.

3. The moving body according to claim 1, wherein the plurality of abutting portions abut the spherical wheel to bias the spherical wheel toward the support.

* * * * *